Dec. 20, 1966  E. K. DOMBECK  3,292,745
DUAL CYLINDER BRAKE
Original Filed Oct. 27, 1964  5 Sheets-Sheet 2
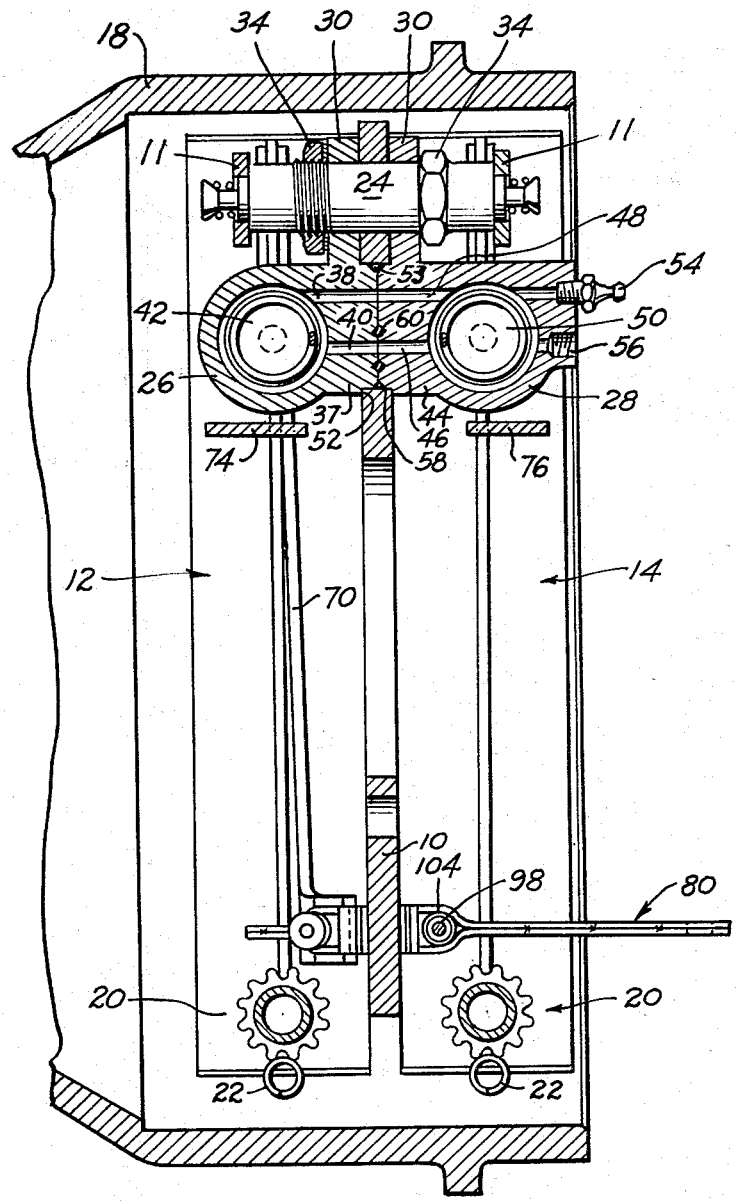
FIG_2
INVENTOR.
EDWARD K. DOMBECK.
BY
*Sheldon F. Raizes*
ATTORNEY Dec. 20, 1966 E. K. DOMBECK 3,292,745
DUAL CYLINDER BRAKE
Original Filed Oct. 27, 1964 5 Sheets-Sheet 3

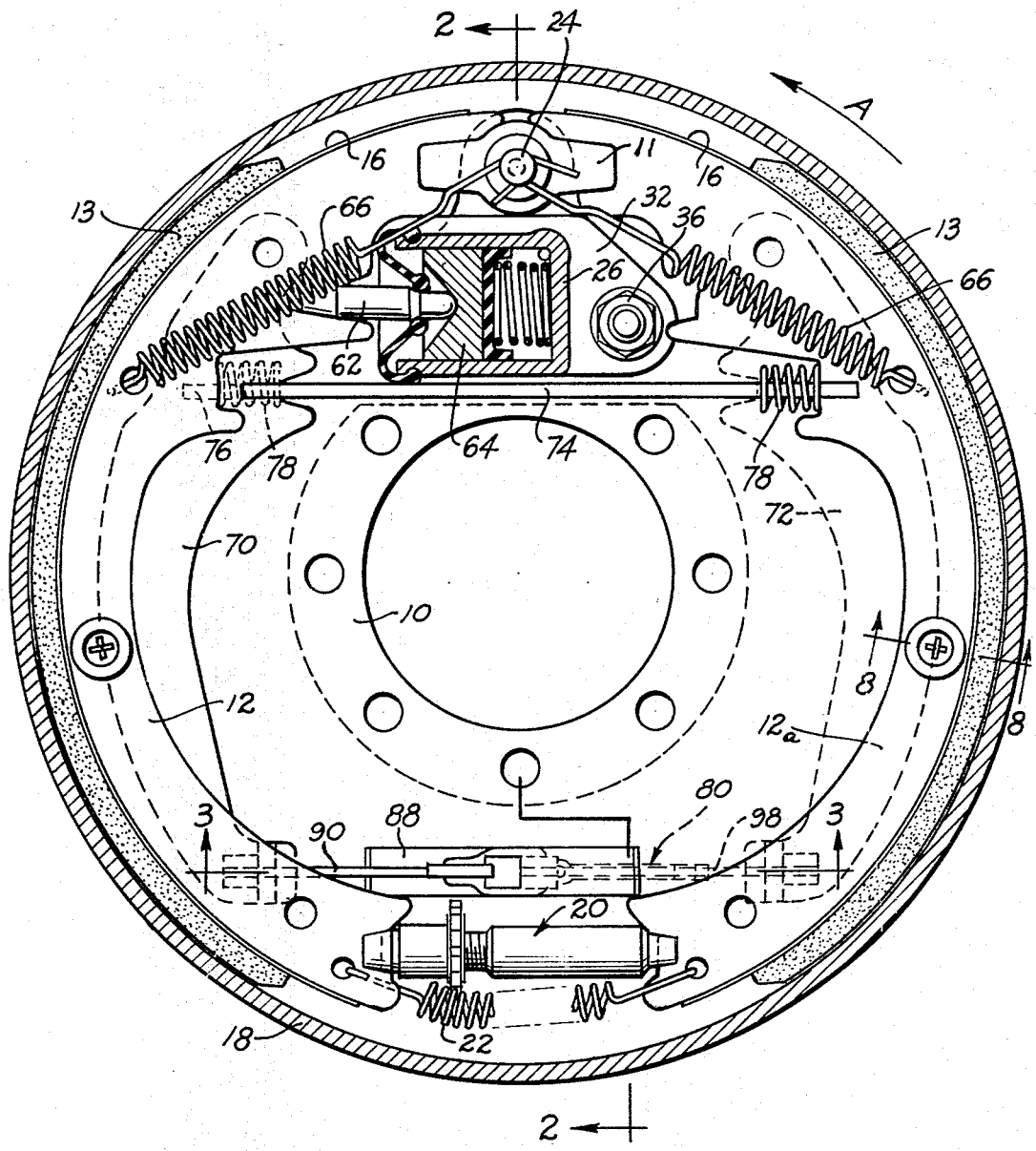
FIG_1
INVENTOR.
EDWARD K. DOMBECK.
BY Sheldon F. Roijer
ATTORNEY.

INVENTOR.
EDWARD K. DOMBECK
BY
*Sheldon F. Raizes*
ATTORNEY.

Dec. 20, 1966 E. K. DOMBECK 3,292,745
DUAL CYLINDER BRAKE
Original Filed Oct. 27, 1964 5 Sheets-Sheet 4
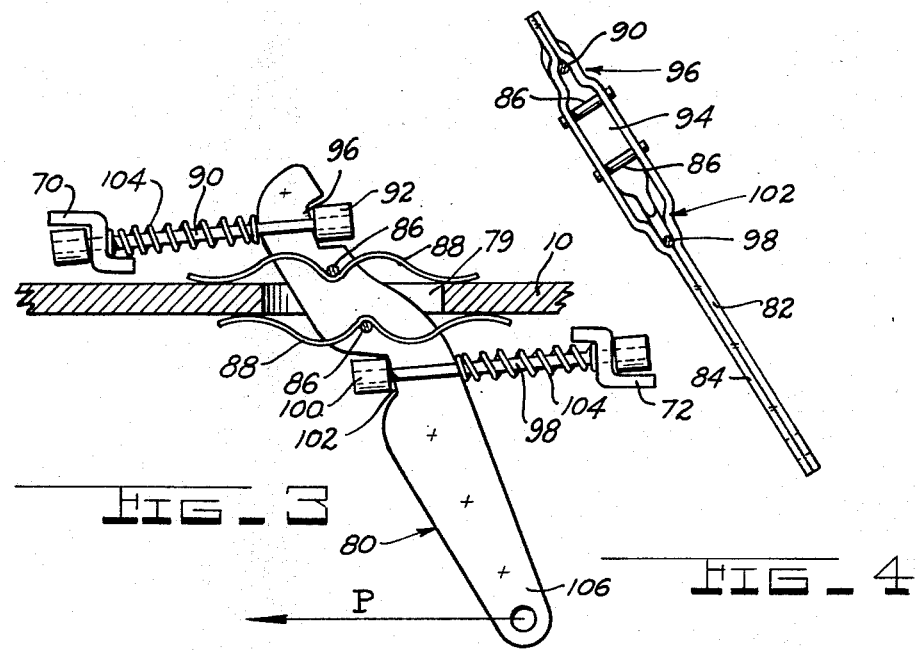
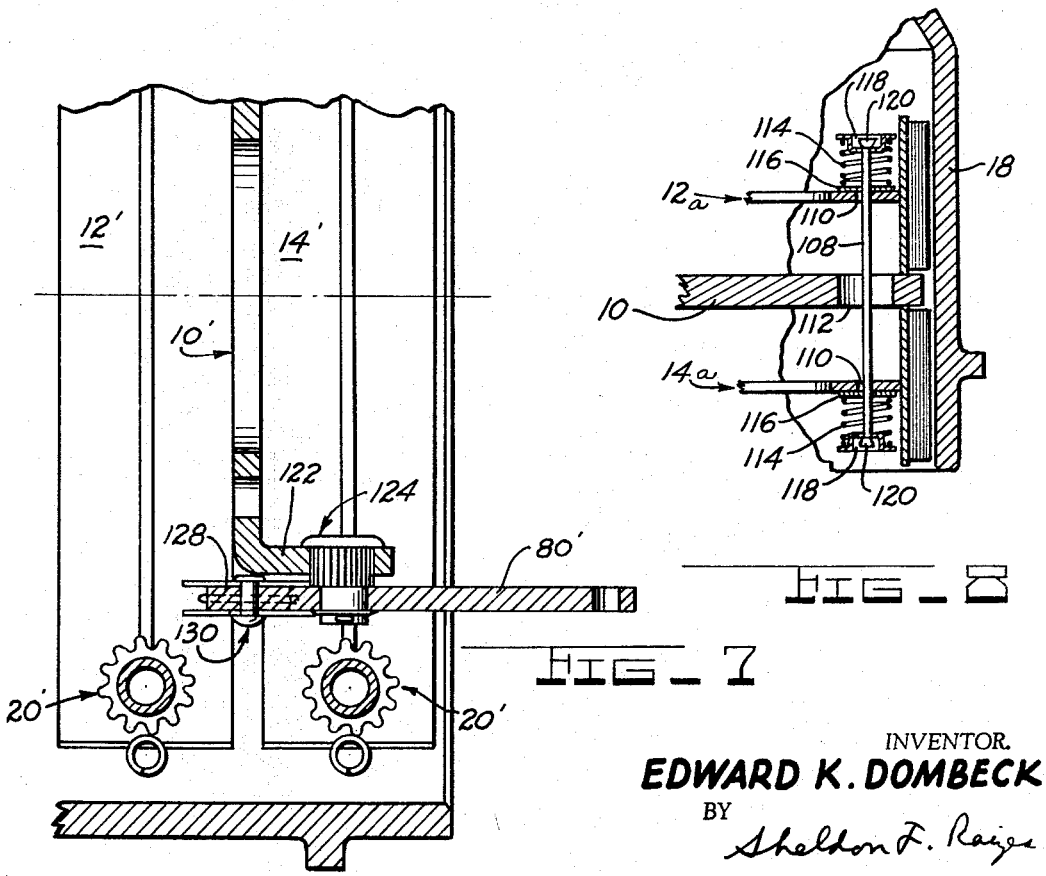
INVENTOR.
EDWARD K. DOMBECK.
BY
ATTORNEY

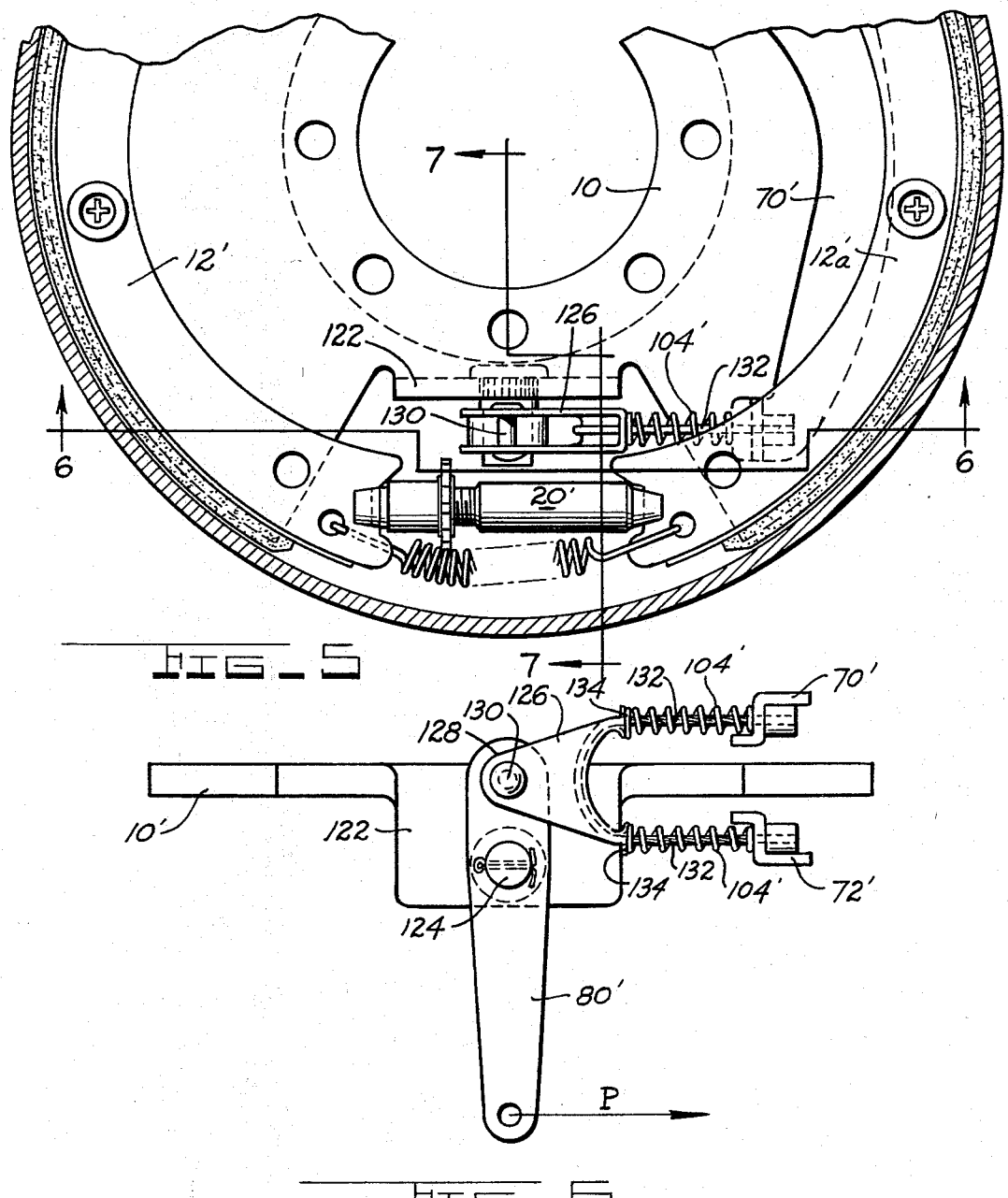

United States Patent Office 3,292,745
Patented Dec. 20, 1966

3,292,745
DUAL CYLINDER BRAKE
Edward K. Dombeck, South Bend, Ind., assignor to The Bendix Corporation, a corporation of Delaware
Continuation of application Ser. No. 406,929, Oct. 27, 1964. This application Feb. 25, 1966, Ser. No. 536,521
5 Claims. (Cl. 188—152)

This application is a continuation-in-whole of copending application Serial No. 406,929, filed October 27, 1964, which, in turn, is a continuation-in-part application of parent application Serial No. 210,768, filed July 18, 1962, both now abandoned.

This invention relates to a drum brake and more particularly to a drum brake for use on a vehicle having a small wheel base diameter and requiring a large braking force for stopping the vehicle.

One of the objects of this invention is to provide a brake having a set of brake shoes slidably mounted on each side of a backing plate.

Another object of this invention is to provide a brake with a wheel cylinder mounted on each face of a backing plate wherein the fluid chambers of each wheel cylinder are interconnected with each other.

A further object of the invention is to provide a brake having a set of brake shoes slidably mounted on each side of a backing plate with a manual control for parking brake operation.

Still another object of the invention is to provide a brake having a set of brake shoes slidably mounted on each side of a backing plate with a shoe hold-down device.

A still further object of the invention is to accomplish the above objects with the utilization of as many standard parts as possible.

Other objects and features of the invention will become apparent from a consideration of the following description wherein a selected example embodiment has been chosen to illustrate the invention. The description proceeds with a reference to the accompanying drawing wherein:

FIGURE 1 illustrates a front elevational view of a brake assembly of the invention;

FIGURE 2 is a view taken along section line 2—2 of FIGURE 1;

FIGURE 3 is a view taken along section line 3—3 of FIGURE 1;

FIGURE 4 is a side elevational view of an actuating lever utilized for parking brake operation;

FIGURE 5 is a partial front elevation view of a modified embodiment for parking brake operation;

FIGURE 6 is a view taken along section line 6—6 of FIGURE 5;

FIGURE 7 is a view taken along section line 7—7 of FIGURE 5; and

FIGURE 8 is a view taken along section line 8—8 of FIGURE 1 illustrating a shoe hold-down device.

Figure 2A:
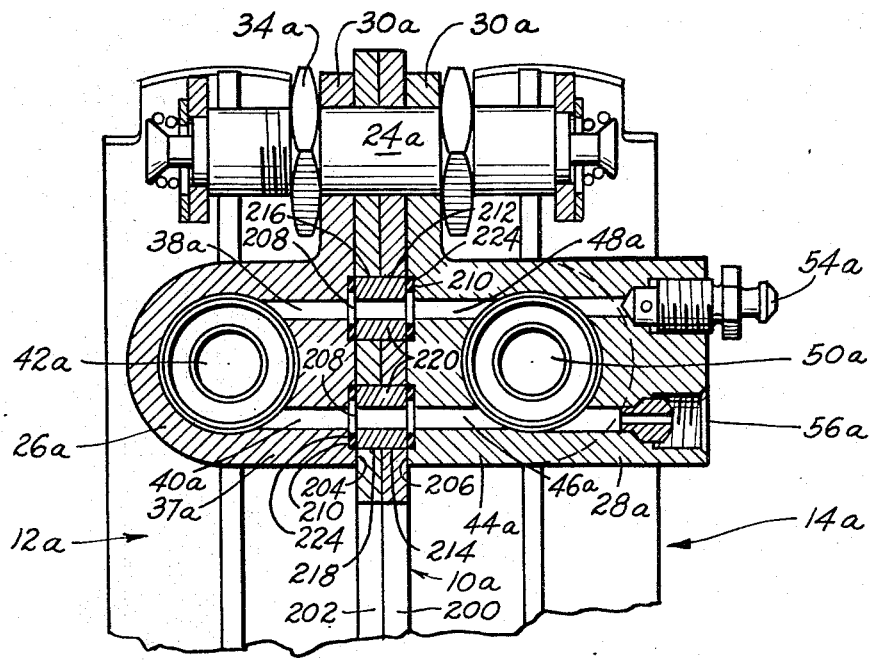
FIGURE 2A is a view similar to FIGURE 2 only a modification thereof.

Referring to FIGURES 1 and 2, a backing plate 10 is provided which may be attached to a stationary part of a vehicle, as for instance, a spindle (not shown). A pair of T-shaped brake shoes 12, 12a are slidably mounted on one face of the backing plate 10 and a pair of brake shoes 14, 14a (FIGURE 8) are slidably mounted on the other face of the backing plate 10 and are located directly behind the first set of brake shoes. Each brake shoe has a friction lining 13 attached to their rims 16 for frictionally engaging a brake drum 18. An adjustable strut 20 is located between and interconnects one set of adjacent ends of the brake shoes of each set and a spring 22 holds the ends of the brake shoes in engagement with the adjustable strut 20. An anchor pin 24 is secured to the backing plate 10 and located between the other adjacent ends of each pair of brake shoes of each set for anchoring abutment thereof. A retainer plate 11 is provided to laterally locate the ends of each pair of brake shoes with respect to the anchor pin 24.

A wheel cylinder 26 is provided on one side of the backing plate for actuating the set of brake shoes 12, 12a and a wheel cylinder 28 is provided on the other face of the backing plate for actuating the other set of brake shoes 14, 14a. Each wheel cylinder has an ear 30 and flange 32 each having an opening therein. The anchor pin 24 extends through the opening of the ears 30 with the nuts 34 pressing the ears into engagement with a backing plate. A bolt and nut assembly 36 extends through the openings in the flanges 32 for pressing the flanges into engagement with the backing plate thereby resulting in fixing the wheel cylinders to the backing plate. The wheel cylinder 26 has a boss 37 extending therefrom which has an inlet port 38 and an outlet port 40 communicating with the wheel cylinder fluid chamber 42. The wheel cylinder 28 has a boss 44 extending therefrom having an inlet port 46 and an outlet port 48 communicating with the fluid chamber 50. Each boss has a flange 52 for engaging the backing plate surfaces or faces. The wheel cylinder 28 further has an inlet port 54, communicating with a master cylinder, and a bleeder port 56. The backing plate has an opening 58 into which each boss 36 and 44 extend. The extent to which the bosses may be placed into the opening 58 is limited by engagement of the ear 30 and the flanges 52 on the backing plate faces. The inlet port 38 and outlet port 48 are aligned and the inlet port 46 and the outlet port 40 are aligned. Each boss has aligned annular notches which receive an O-ring 60 for separating the aligned ports 46 and 40 from the other aligned ports 38 and 48 and each boss has a shoulder therein which forms an annular notch when the bosses abut each other for receiving another O-ring 53 which separates the aligned ports from the exterior of the wheel cylinders. Thus, it can be seen that fluid communicated to the inlet nozzle 54 will travel to each fluid chamber 42 and 50 and when it is desired to bleed the wheel cylinder fluid chambers, the fluid will pass through ports 40 and 46 and bleed port 56.

A thrust element 62 of each respective wheel cylinder interconnects a piston 64 with the brake shoe 12 of one set of brake shoes and the brake shoe 14 of the other set of brake shoes. Assuming rotation of the brake drum in the direction of the arrow A, the brake shoes 12 and 14 will be the leading brake shoes and the brake shoes 12a and 14a will be the trailing brake shoes. Upon actuation of the wheel cylinders the thrust element 62 will thrust the brake lining 13 of the brake shoes 12 and 14 against the brake drum surface and upon engagement of the friction linings with the brake drum the shoes 12 and 14 will tend to rotate the brake drum thereby transferring their movement to the brake shoes 12a and 14a through the struts 20 effecting engagement of the linings of brake shoes 12a and 14a with the drum 14. Upon release of the pressure in the wheel cylinders, springs 66 will urge the brake shoes to retracted position. While a wheel cylinder having one piston for spreading only one shoe has been illustrated, obviously an opposed piston wheel cylinder for spreading both shoes of a set may be utilized.

Referring to FIGURE 2A, there is illustrated a modified version of an interconnection between two wheel cylinders. All elements which are similar to those of FIGURE 2 are designated with the same reference numeral with an *a* affixed thereto. In this instance the support 10*a* comprises two superimposed plates 200 and 202 secured together. Each of the bosses 37*a* and 44*a* of the wheel cylinders 26*a* and 28*a*, respectively, has a flat face 204 and 206, respectively, which engages an exposed surface of a respective one of the plates 200 aand 202. Each of the ports 38*a*, 40*a*, 46*a*, and 48*a* has a sealing ring receiving counterbored portion 208 opening into a respective one of the end faces 204 and 206. Each of the counterbored portions 208 comprises a shoulder 210 extending transversely to the annular wall thereof. The plate 200 has a pair of openings 212, 214 and the plate 202 has a pair of openings 216, 218 which are aligned with openings 212 and 214, respectively. The set of openings 212 and 216 are aligned with the wheel cylinder ports 38*a* and 48*a* and the set of openings 214 and 218 are aligned with the wheel cylinder ports 40*a* and 46*a*. An annular spacer member 220 is located within the openings 212 and 216 and an annular spacer member 222 is located within the openings 214 and 218. A resilient sealing ring 224 is located in each of the counterbored portions of the ports and are compressed between a respective end of the spacer members and a respective shoulder 210 to provide fluid tight communication between the ports 38*a* and 48*a* and the ports 40*a* and 46*a*.

Figure 2B:
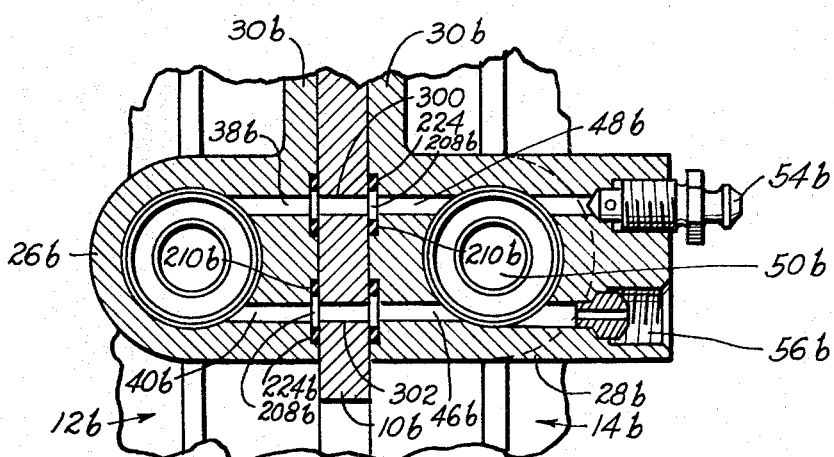
FIGURE 2B is a view similar to FIGURE 2A only a modification thereof.

Referring to the embodiment in FIGURE 2B, the elements which are similar to those in the embodiment of FIGURE 2A are designated with the same reference numerals with a *b* affixed thereto. This embodiment differs from the embodiment in FIGURE 2A in that the support 10*b* is a single plate and the ports 38*b* and 48*b* are communicated directly through an opening 300 in the support plate 10*b* and the ports 40*b* and 46*b* are communicated directly through the opening 302 in the support plate 10*b* rather than communicated through spacer members. The sealing rings 224 are compressed between their respective faces on the support plate 10*b* and their respective shoulders 210*b* of the counterbored portion 208*b* of the ports to provide a fluid tight connection between the ports 38*b* and 48*b* and the ports 40*b* and 46*b*.

*Parking brake*

For parking brake operation, a lever 70 is pivotally mounted at one end to the web of the brake shoe 12 and a lever 72 is pivotally mounted at one end to the brake shoe 14*a*. A strut 74 interconnects the lever 70 with the brake shoe 12*a* and a strut 76 interconnects the lever 72 with the brake shoe 14. Springs 78 are carried by a portion of each strut for preventing rattling of the strut which is retained within a notch of their respective brake shoes. A slot 79 is provided in the backing plate for receiving a parking brake actuating lever 80 which extends on both sides of the backing plate and is constructed of two stampings 82 and 84 welded together at their ends and spread apart intermediate the ends. Two pins 86 extend between the spread apart portions of the stampings 82 and 84 and are engaged by springs 88 slidably compressed between the backing plate and the pins 86 for holding the lever 80 in position. A cable 90 is attached to the lever 70 and has an abutment 92 which is inserted through the wider opening 94 of the lever 80 and then held in place by the narrower opening and notch 96. A cable 98 is attached to the lever 72 and has an abutment 100 at the end thereof which is inserted through the wider opening 94 of the lever 80 and held in position by the narrower opening and notch 102. Springs 104 are compressed between the lever 70 and lever 80 and between lever 72 and lever 80 for urging the levers 70 and 72 to their retracted position. Upon applying a force P to the end 106 of the lever 80, the lever 80 will fulcrum about the abutment 92 and 100 until the levers 70 and 72 are drawn toward each other to bring the linings of their respective brake shoes into engagement with the drum. Upon release of the lever 80 the springs 66 will urge the brake shoes to their retracted position and the springs 104 will urge the levers 70 and 72 to their respective retracted positions.

Referring to FIGURES 5–7 for the modified embodiment of the lever connection for parking brake operation, similar structure to the previous embodiment is illustrated by like reference numerals with primes attached thereto. The backing plate 10′ has a downwardly turned flange 122 and a parking brake lever 80′ is pivotally attached to the flange 122 by a bolt 124. A generally U-shaped bracket 126 is rigidly attached to the end 128 of the lever 80′ by a rivet 130. The levers 70′ and 72′ are now axially aligned, one behind the other, and are therefore each on the same side of the lever 80′ and both must be pulled in the same direction for spreading the brake shoes. A cable 132 has one end thereof attached to the lever 70′ and the other end attached to the lever 72′ and has a portion intermediate its ends extending through the U-shaped bracket. The U-shaped bracket has flanges 134 which serve as abutting surfaces for the springs 104′ which urge the lever 70′ and 72′ to their retracted positions. Upon movement of the parking brake lever 80′ by the force P′ the parking brake lever will move the bracket thereby moving the levers 70′ and 72′ for spreading the brake shoes. Obviously separate cables could be used to connect levers 70′ and 72′ to the bracket 126 rather than a single cable 132.

Referring to FIGURE 8, there is illustrated a brake hold-down device consisting of a pin 108 extending through aligned openings 110 in the webs of brake shoes 12*a* and 14*a* and an aligned opening 112 of the backing plate. A spring 114 is compressed between a plate 116 which engages its respective web of a brake shoe and a cup 118 which is held from outward movement by each end 120 of the pin 108. The brake shoes are therefore biased toward each other and into engagement with the backing plate by the brake shoe hold-down device.

The embodiments of the invention have been chosen for purposes of illustration, and it will be understood that they are in no way restrictive of the invention. It is reasonably to be expected that those skilled in the art may make numerous adaptations and revisions of the invention without departing from the spirit and scope of the invention and therefore it is intended that such revisions and variations as incorporate the herein disclosed principles, will be included within the following claims as equivalents thereof.

I claim:
1. In a drum brake comprising: a support member having a pair of opposed surfaces thereon, a pair of wheel cylinders each having a boss thereon, each of said bosses having a generally flat end face, means securing said wheel cylinders to said support member in such a manner that the flat end face of the boss of one of said wheel cylinders engages one of said opposed surfaces and the flat end face of the boss of the other of said wheel cylinders engages the other of said opposed surfaces, one of said wheel cylinders having a hose inlet opening and a bleeder opening communicating with its respective wheel cylinder fluid chamber, each boss having an inlet port and an outlet port communicating with its respective wheel cylinder fluid chamber, a pair of spaced openings in said support member, said wheel cylinders being arranged on said support member so that one of said openings of said support member is aligned with the inlet port of one of said bosses and the outlet port of the other of said bosses and the other of said openings of said support member is aligned with the outlet port of said one boss and the inlet port of said other boss, an annular spacer member in each of said openings of said support member, a plurality of resilient members surrounding a respective one of said ports and being compressed between its respective end face and its respective end of said spacer member to provide a fluid tight connection between each set of opposing inlet and outlet ports.

2. In a drum brake comprising: a support member having a pair of opposed surfaces thereon, a pair of wheel cylinders each having a boss thereon, each of said bosses having a generally flat end face, means securing said wheel cylinders to said support member in such a manner that the flat end face of the boss of one of said wheel cylinders engages one of said opposed surfaces and the flat end face of the boss of the other of said wheel cylinders engages the other of said opposed surfaces, one of said wheel cylinders having a hose inlet opening and a bleeder opening communicating with its respective wheel cylinder fluid chamber, each boss having an inlet port and an outlet port communicating with its respective wheel cylinder fluid chamber, a pair of spaced openings in said support member, said wheel cylinders being arranged on said support member that one of said openings of said support member is aligned with the inlet port of one of said bosses and the outlet port of the other of said bosses and the other of said openings of said support member is aligned with the outlet port of said one boss and the inlet port of said other boss, a plurality of resilient members, each of said resilient members surrounding a respective one of said ports and being compressed between its respective end face and its respective support member surface to provide a fluid tight connection between each set of opposing inlet and outlet ports.

3. In a drum brake comprising: a support member having a pair of opposed surfaces thereon, a pair of wheel cylinders each having a boss thereon, each of said bosses having a generally flat end face, means securing said wheel cylinders to said support member in such a manner that the flat end face of the boss of one of said wheel cylinders engages one of said opposed surfaces and the flat end face of the boss of the other of said wheel cylinders engages the other of said opposed surfaces, one of said wheel cylinders having a hose inlet opening and a bleeder opening communicating with its respective wheel cylinder fluid chamber, each boss having an inlet port and an outlet port communicating with its respective wheel cylinder fluid chamber, each of said ports having a counterbored portion opening into the face of its respective boss, each counterbored portion including an annular wall and an annular shoulder extending transversely to said wall and spaced from said face, a pair of spaced openings in said support member, said wheel cylinders being arranged on said support member that one of said openings of said support member is aligned with the inlet port of one of said bosses and the outlet port of the other of said bosses and the other of said openings of said support member is aligned with the outlet port of said one boss and the inlet port of said other boss, a resilient member located in each counterbored portion of said ports and compressed between its respective said annular shoulder and its respective support member surface to provide a fluid tight connection between each set of opposing inlet and outlet ports.

4. In a drum brake comprising: a support member comprising two plates secured together with the inner faces thereof being superimposed upon each other and the outer faces thereof being exposed and facing opposite directions, a pair of wheel cylinders each having a boss thereon, each of said bosses having a generally flat end face, means securing said wheel cylinders to said support member in such a manner that the flat end face of the boss of one of said wheel cylinders engages the outer surface of one of said plates and the flat end face of the boss of the other of said wheel cylinders engages the outer surface of the other of said plates, one of said wheel cylinders having a hose inlet opening and a bleeder opening communicating with its respective wheel cylinder fluid chamber, each boss having an inlet port and an outlet port communicating with its respective wheel cylinder fluid chamber, a first set of aligned openings in said plates, a second set of aligned openings in said plates, said wheel cylinders being arranged on said plates that one set of openings is aligned with the inlet port of one of said bosses and the outlet port of the other of said bosses and the other set of openings are aligned with the outlet port of said one boss and the inlet port of said other boss, an annular spacer member in each set of openings, a plurality of resilient members, each of said resilient members surrounding a respective one of said ports and being compressed between its respective end face and its respective end of said spacer member to provide a fluid tight connection between each set of opposing inlet and outlet ports.

5. In a drum brake comprising: a support member comprising two plates secured together with the inner faces thereof being superimposed upon each other and the outer faces thereof being exposed and facing opposite directions, a pair of wheel cylinders each having a boss thereon, each of said bosses having a generally flat end face, means securing said wheel cylinders to said support member in such a manner that the flat end face of the boss of one of said wheel cylinders engages the outer surface of one of said plates and the flat end face of the boss of the other of said wheel cylinders engages the outer surface of the other of said plates, one of said wheel cylinders having a hose inlet opening and a bleeder opening communicating with its respective wheel cylinder fluid chamber, each boss having an inlet port and an outlet port communicating with its respective wheel cylinder fluid chamber, each of said ports having a counterbored portion opening into the face of its respective boss, each counterbored portion including an annular wall and an annular shoulder extending transversely thereto and spaced from said face, a first set of aligned openings in said plates, a second set of aligned openings in said plates, said wheel cylinders being arranged on said plates that one set of openings is aligned with the inlet port of one of said bosses and the outlet port of the other of said bosses and the other set of openings is aligned with the outlet port of said one boss and the inlet port of said other boss, an annular spacer member in each set of openings, a resilient member located in each counterbored portion of said ports and compressed between its respective said annular shoulder and its respective end of said spacer member to provide a fluid tight connection between each set of opposing inlet and outlet ports.

References Cited by the Examiner

UNITED STATES PATENTS 2,496,562   2/1950   Schnell _____ 188—152

FOREIGN PATENTS 788,586   1/1958   Great Britain.

MILTON BUCHLER, *Primary Examiner.*

G. E. A. HALVOSA, *Assistant Examiner.*